H. R. READ.
VEHICLE.
APPLICATION FILED SEPT. 22, 1913. RENEWED JUNE 27, 1917.

1,363,917.

Patented Dec. 28, 1920.
2 SHEETS—SHEET 2.

WITNESSES:
Louise Enderle
Aug. T. Jurgensen

INVENTOR
Henry R. Read
BY
Thomas A. Hill
ATTORNEY

UNITED STATES PATENT OFFICE.

HENRY R. READ, OF BROOKLYN, NEW YORK.

VEHICLE.

1,363,917.  Specification of Letters Patent.  Patented Dec. 28, 1920.

Application filed September 22, 1913, Serial No. 791,016. Renewed June 27, 1917. Serial No. 177,369.

*To all whom it may concern:*

Be it known that I, HENRY R. READ, a citizen of the United States, residing at the borough of Brooklyn, in the county of Kings and State of New York, have invented certain new and useful Improvements in Vehicles, of which the following is a specification, reference being had therein to the accompanying drawing.

My invention relates to improvements in vehicles and more particularly has reference to vehicles of the type generally used by contractors for carrying stone, dirt, ashes, garbage and similar materials.

According to my invention the back of the cart or vehicle may be opened and the contents ejected as the body is tilted without the necessity of the driver or operator leaving the seat of the vehicle, and to this end the invention contemplates various mechanical means hereinafter set forth.

Figure 1:
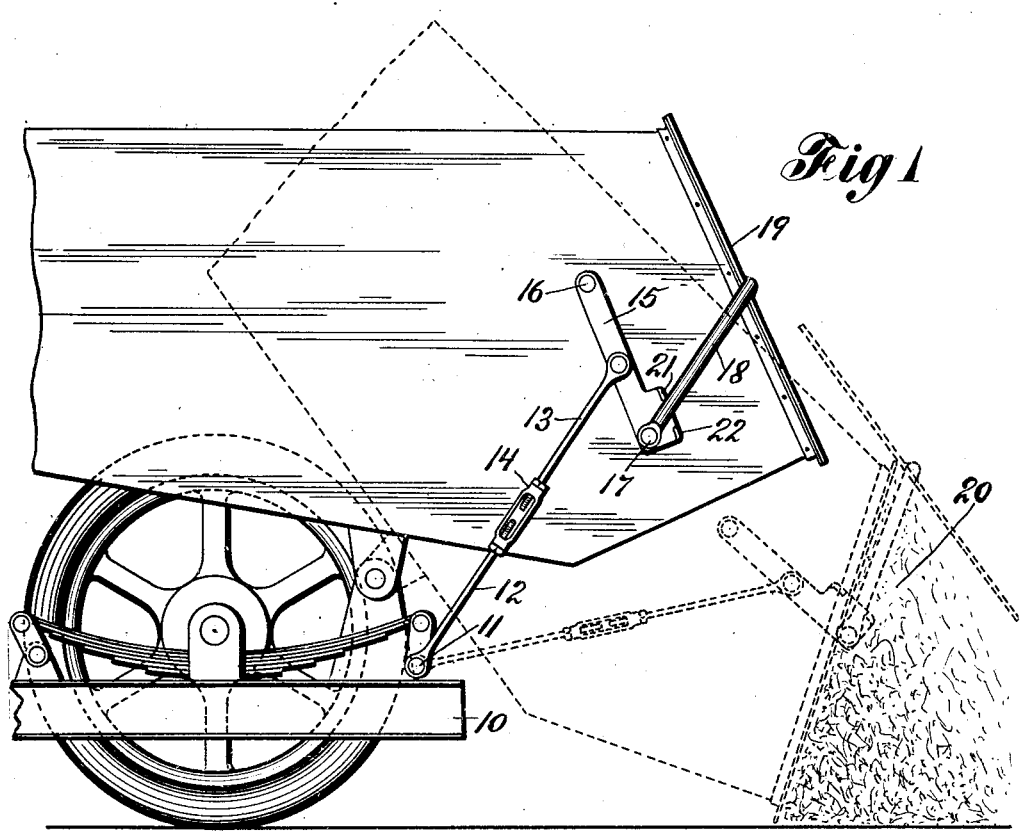
Figure 2:
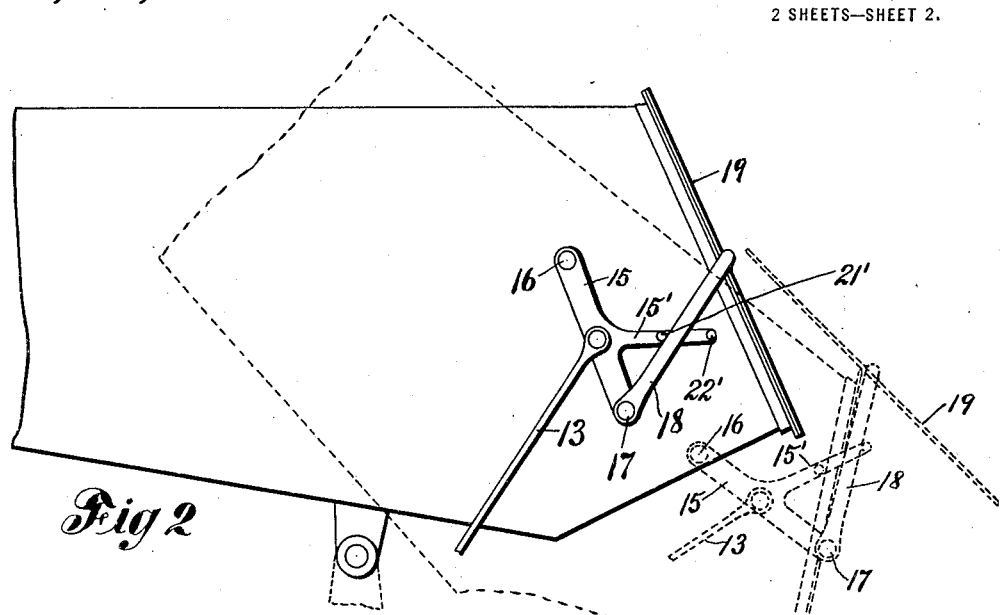
Figure 3:
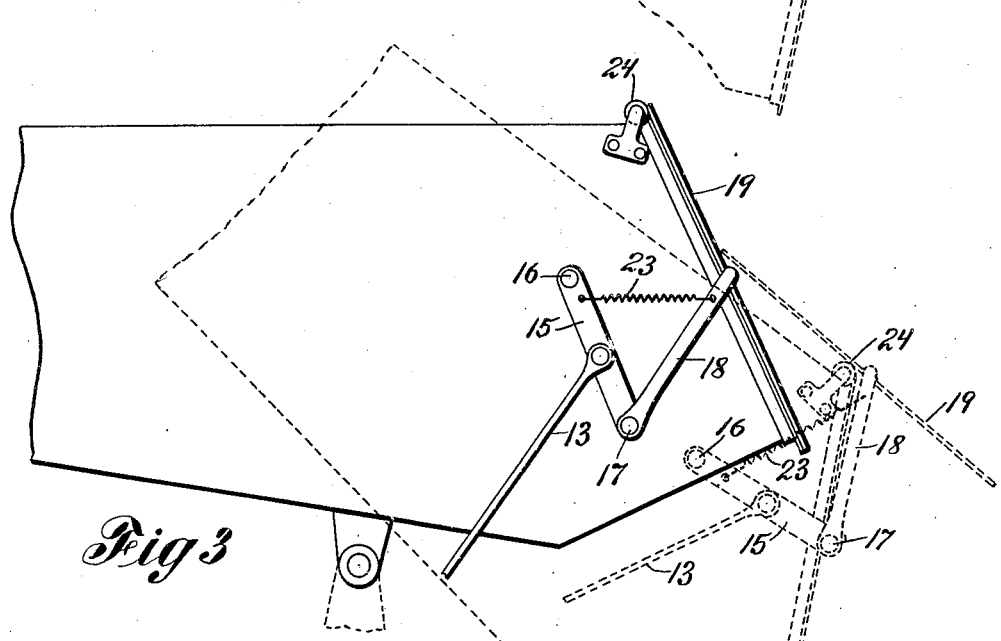

Referring to Figure 1 of the drawing, the same indicates, partly in section, the rear portion of a vehicle embodying one application of my invention, and the position of the same while dumping, in dotted outline. Fig. 2 is a similar view showing a modification, and Fig. 3 another similar view showing another modification.

Referring now more particularly to Fig. 1, 10 is the lower framework of the vehicle carrying the usual springs and wheels, the movable body having a bottom tapering downwardly and rearwardly then upwardly forming a recess or well as shown. 11 is a suitable support thereupon upon which is pivotally mounted a rod such as 12 connected to the rod 13 by any suitable means such as the turn-buckle 14. 15 is a lever preferably pivoted to the body of the vehicle as indicated at 16, and having pivoted at the opposite end as at 17, another lever or bracket such as 18, which may be secured to the cover 19 at the back of the vehicle as shown. Any well known means may be employed for raising the front of the body of the vehicle, and by so doing it will be observed that the levers 12—13 lift the lever 15 causing the cover 19 attached to the bracket 18 to move outwardly and upwardly over the top of the back of the vehicle from off the framing thereof as shown in dotted outline; thus directing the discharge of the contents of the vehicle as indicated by the reference character 20. 21—22 are suitable stops upon the lever 15 to limit the movement of the bracket 18; thus controlling the position of the back of cover 19.

Referring now to Fig. 2, it will be observed that the lever 15 is provided with an auxiliary arm or bracket 15' upon which are provided stops such as 21'—22' which may or may not be resilient. This modification it will be observed is otherwise substantially similar to the structure shown in Fig. 1. In the modification shown in Fig. 3 it will be observed that the stops are eliminated, and a suitable spring such as 23 is substituted, secured at one end to the lever 15 and to the other end to the bracket 18, as shown. In this modification, however, the cover 19 may be made to turn freely upon the bracket 18 and the upper portion of the body may be provided with suitable rollers such as 24 so that as the cover drops the back will roll upwardly over the top of the back of the vehicle as shown dotted outline in said Fig. 3.

Of course it will be understood that various modifications may be made without departing from the spirit of the invention as claimed.

I claim:

1. A vehicle having a movable body, a movable door therefor, and means in combination with said door and a part of said vehicle whereby said door is automatically moved simultaneously with the movement of said body, said means comprising a lever pivoted upon said body, another lever pivoted upon said part of said vehicle and upon said first mentioned lever, and connection between said first mentioned lever and said door, said connection rigidly secured to said door, and a stop connected to said first mentioned lever to limit the movement of said connection and door.

2. In combination with a vehicle having a movable body and a tail-gate, means for moving said tail-gate entirely away from and over the top of the rear end of said body as the front of said body is elevated, said means including levers pivotally connecting said vehicle, said body, and said gate, one of said levers pivoted at one end to an immovable part of said vehicle, another lever pivoted to the movable body of said vehicle, the other end of the lever pivoted to the immovable part of said vehicle pivoted to the lever pivoted to said body, and the free end of said lever pivoted to said body, pivotally connected to a lever secured to said gate.

3. In combination with a vehicle having a movable body and a tail-gate, means for moving said tail-gate entirely away from and over the top of the rear end of said body as the front of said body is elevated, said means including levers pivotally connecting said vehicle, said body, and said gate, one of said levers being pivoted to the body, a second lever pivoted at one end to an immovable part of said vehicle, the other end thereof pivoted to the lever pivoted to said body, the free end of the lever pivoted to said body being pivotally connected to a lever secured to said gate, and means for adjusting one of said levers.

4. In combination with a vehicle having a movable body and a tail-gate, means for moving said tail-gate entirely away from and over the top of the rear end of said body as the front of said body is elevated, said means including levers pivotally connecting said vehicle, said body, and said gate, one of said levers being pivoted to the body, a second lever pivoted at one end to an immovable part of said vehicle, the other end thereof pivoted to the lever pivoted to said body, the free end of said lever pivoted to said body being pivotally connected to a lever secured to said gate, and a framing between the end of said body and said gate.

5. In combination with a vehicle having an unhinged tail-gate, means for moving said tail-gate away from and over the top of the rear end of said vehicle as the front of the same is elevated, said means comprising levers pivotally connecting said vehicle and said gate, one of said levers pivoted at one end upon the truck of said vehicle, and at the other end to another lever pivoted upon the body of said vehicle, and upon said lever pivoted upon said body, a pivotally mounted rigid part of said gate.

6. In combination with a vehicle having a movable body and a tail-gate, means for moving said gate entirely away from and over the top of the rear end of said body, as the front of the same is elevated, the bottom of said body tapering downwardly and rearwardly and then upwardly to said gate forming a depression when said vehicle is closed and providing a declining chute when said vehicle is opened.

7. A vehicle having a movable body, a movable door therefor, and means in combination with said door and a part of said vehicle whereby said door is automatically moved simultaneously with the movement of said body, said means comprising a lever pivoted upon said body, another lever pivoted upon said part of said vehicle and upon said first mentioned lever, and connection between said first mentioned lever and said door, whereby said door is moved away from and over the top of the rear end of said body as the front of the same is elevated.

8. A vehicle having a movable body, a movable door therefor, and means in combination with said door and a part of said vehicle whereby said door is automatically moved simultaneously with the movement of said body, said means comprising a lever pivoted upon said body, another lever pivoted upon said part of said vehicle and upon said first mentioned lever, and connection between said first mentioned lever and said door, whereby said door is moved away from and over the top of the rear end of said body as the front of the same is elevated, and a framing between the end of said body and said door.

In testimony whereof I hereunto affix my signature in the presence of two witnesses.

HENRY R. READ.

Witnesses:
 LOUISE ENDERLE,
 THOMAS A. HILL.